United States Patent
Herrmann et al.

(10) Patent No.: US 11,376,880 B2
(45) Date of Patent: Jul. 5, 2022

(54) VARIABLE PRINTED UV CURABLE ADHESIVE RETAIL SIGNS

(71) Applicant: Xerox Corporation, Norwalk, CT (US)

(72) Inventors: Douglas K. Herrmann, Webster, NY (US); Seemit Praharaj, Webster, NY (US); Jason M. LeFevre, Penfield, NY (US); Paul J. McConville, Webster, NY (US); Chu-Heng Liu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/124,951

(22) Filed: Dec. 17, 2020

(65) Prior Publication Data

US 2021/0101399 A1 Apr. 8, 2021

Related U.S. Application Data

(62) Division of application No. 15/873,056, filed on Jan. 17, 2018, now Pat. No. 10,899,155.

(51) Int. Cl.
*C09D 11/101* (2014.01)
*B41M 5/00* (2006.01)
(Continued)

(52) U.S. Cl.
CPC .......... *B41M 7/0081* (2013.01); *B05D 3/067* (2013.01); *B31D 1/021* (2013.01); *B41J 2/01* (2013.01);
(Continued)

(58) Field of Classification Search
None
See application file for complete search history.

(56) References Cited

U.S. PATENT DOCUMENTS

| | | | | |
|---|---|---|---|---|
| 5,376,418 A | * | 12/1994 | Rogers | G09F 3/20 428/343 |
| 6,348,262 B1 | * | 2/2002 | Huffman | B44C 1/105 427/208.4 |

(Continued)

FOREIGN PATENT DOCUMENTS

| EP | 2644405 A1 | 10/2013 |
|---|---|---|
| EP | 2786878 A1 | 10/2014 |

(Continued)

OTHER PUBLICATIONS

Brookfield Dial Reading Viscometer (serial No. 200500) downloaded on Jan. 22, 2018, from www.brookfieldengineering.com/products/viscometers/laboratory-viscometers/dial-reading-viscometer, pp. 1-5.

*Primary Examiner* — Alejandro Valencia
(74) *Attorney, Agent, or Firm* — Fay Sharpe, LLP

(57) ABSTRACT

An adhesive sign suited to use in retail applications includes a substrate layer. An adhesive layer is disposed on the substrate layer. The adhesive layer defines an exposed region for attachment to an associated structure. The adhesive layer is derived from a photo-curable inkjet composition. An ink layer is disposed on the substrate layer. The ink layer includes an image. The ink layer is derived from a photo-curable inkjet composition. The adhesive layer and ink layer can be formed in the same inkjet printing process and cured in a common photo-curing station. A stack of the adhesive signs can be assembled without interleaving a release liner between each pair of signs.

3 Claims, 6 Drawing Sheets

(51) Int. Cl.

| | |
|---|---|
| *B41M 7/00* | (2006.01) |
| *B41J 2/01* | (2006.01) |
| *C09D 133/14* | (2006.01) |
| *C09D 133/08* | (2006.01) |
| *B05D 3/06* | (2006.01) |
| *B31D 1/02* | (2006.01) |
| *B41M 3/00* | (2006.01) |
| *C09J 7/30* | (2018.01) |

(52) U.S. Cl.
CPC .......... *B41M 3/006* (2013.01); *B41M 5/0017* (2013.01); *C09D 11/101* (2013.01); *C09D 133/08* (2013.01); *C09D 133/14* (2013.01); *C09J 7/30* (2018.01); *C09J 2203/334* (2013.01); *C09J 2301/40* (2020.08); *C09J 2301/416* (2020.08); *C09J 2433/00* (2013.01)

(56) References Cited

U.S. PATENT DOCUMENTS

| | | | |
|---|---|---|---|
| 6,457,585 B1 | 10/2002 | Huffer et al. | |
| 6,475,585 B1 * | 11/2002 | Yamanashi | C09J 7/38 428/40.1 |
| 6,910,667 B2 * | 6/2005 | O'Leary | B32B 7/02 248/205.3 |
| 7,673,909 B2 | 3/2010 | Rousselet | |
| 8,746,490 B2 * | 6/2014 | Hutter | B32B 3/06 156/247 |
| 2002/0128340 A1 | 9/2002 | Young et al. | |
| 2005/0190248 A1 * | 9/2005 | Konno | B41J 11/002 347/102 |
| 2006/0234014 A1 | 10/2006 | Liu et al. | |
| 2007/0093571 A1 | 4/2007 | Tamai et al. | |
| 2008/0063799 A1 | 3/2008 | Tennis et al. | |
| 2008/0090932 A1 * | 4/2008 | Madhusoodhanan | C09D 11/101 522/144 |
| 2008/0316244 A1 | 12/2008 | Lugassi et al. | |
| 2013/0258018 A1 | 10/2013 | Nakajima et al. | |
| 2014/0227494 A1 | 8/2014 | Furuhata et al. | |
| 2014/0302289 A1 | 10/2014 | Duzy et al. | |
| 2015/0035919 A1 * | 2/2015 | Ohnishi | B41M 3/12 347/102 |
| 2015/0353739 A1 | 12/2015 | Webster et al. | |
| 2016/0125768 A1 | 5/2016 | Herrmann | |
| 2016/0185557 A1 | 6/2016 | Herrmann et al. | |
| 2016/0358520 A1 | 12/2016 | Herrmann et al. | |
| 2016/0362583 A1 | 12/2016 | Naik et al. | |
| 2017/0087876 A1 | 3/2017 | Nakajima et al. | |
| 2018/0319177 A1 | 11/2018 | Nakajima et al. | |

FOREIGN PATENT DOCUMENTS

| | | |
|---|---|---|
| EP | 2942203 A1 | 11/2015 |
| WO | WO 2002066571 A2 | 8/2002 |

* cited by examiner

VARIABLE PRINTED UV CURABLE ADHESIVE RETAIL SIGNS

This application is a Divisional of U.S. application Ser. No. 15/873,056, filed Jan. 17, 2018, the disclosure of which is incorporated herein in its entirety, by reference.

BACKGROUND

The exemplary embodiment relates to printed signage suitable for retail applications and finds particular application in connection with an adhesive sign and method of manufacture.

Adhesive signs are often used in retail applications to provide product information, such as prices and reference numbers of items offered for sale. These are adhered on or adjacent to store shelves that display the items. One process used to manufacture adhesive signage for store shelving includes applying an adhesive tape to a paper or other substrate. The product information is then printed on the resulting multi-layer assembly, and it is cut to the desired size for the signs. The adhesive tape includes a carrier layer with a pressure sensitive adhesive (PSA) on one side and a permanent adhesive on the other. The PSA layer is protected with a release liner. Problems can occur in printing the multi-layer assembly, including deposit of the adhesive on the printer components, such as print heads, slitters and diecutters, and feed problems due to uneven deformation of the multi-layer assembly. The adhesive tape used in the process is applied to the entire paper surface and adds considerable cost to the signs. Additionally, at a store, the removal of the tape release liner can be time consuming, particularly when large numbers of signs are to be positioned throughout the store.

There remains a need for an adhesive sign and method of manufacture which address these problems.

INCORPORATION BY REFERENCE

The following references, the disclosures of which are incorporated in their entireties by reference, are mentioned:

UV-curable inks with adhesive properties are described, for example, in U.S. Pub. No. 20080316244, published Dec. 25, 2008, entitled UV CURABLE INK WITH IMPROVED ADHESION, by Lugassi, et al.; U.S. Pub. No. 20070093571, published Apr. 26, 2007, entitled ULTRA-VIOLET-CURING RESIN COMPOSITION, PAINT, INK, ADHESIVE, SEALING AGENT AND PRIMER, by Tamai, et al.; U.S. Pub. No. 20080063799, published Mar. 13, 2008, entitled DOT SIZE CONTROLLING PRIMER COATING FOR RADIATION CURABLE INK JET INKS, by Tennis, et al.; U.S. Pub. No. 20150353739, published Dec. 10, 2015, entitled EC PRIMER COATING FOR PAPER AND PAPERBOARD, by Webster, et al.; and U.S. Pub. No. 20140227494, published Aug. 14, 2014, entitled UV INK FIXED STRUCTURE AND UV INK PRINTING, by Furuhata, et al.

Printing of signage is described, for example, in U.S. Pub. No. 20160358520, published Dec. 8, 2016, entitled CONTROLLED SILICONE RELEASE DURING XEROGRAPHIC PRINTING TO CREATE PRESSURE SENSITIVE ADHESIVE RELEASE COAT, by Herrmann, et al.; U.S. Pub. No. 20160185557, published Jun. 30, 2016, entitled MULTI-STAGE COLLATION SYSTEM AND METHOD FOR HIGH SPEED COMPILING SEQUENTIALLY ORDERED SIGNAGE, by Herrmann, et al.; and U.S. Pub. No. 20160125768, published May 5, 2016, entitled METHOD AND APPARATUS FOR INLINE ADHESIVE SIGNAGE, by Herrmann.

BRIEF DESCRIPTION

In accordance with one aspect of the exemplary embodiment, an adhesive sign includes a substrate layer. An adhesive layer is disposed on the substrate layer, the adhesive layer defining an exposed region for attachment to an associated structure. The adhesive layer is derived from a photo-curable inkjet composition. An ink layer is disposed on the substrate layer. The ink layer includes an image. The ink layer is derived from a photo-curable inkjet composition.

In accordance with another aspect of the exemplary embodiment, a method of forming an adhesive sign includes providing a substrate layer. A first composition is inkjet printed on the substrate layer. The first composition includes at least one of a photo-curable monomer and a photo-curable oligomer and has a first viscosity. A second composition is inkjet printed to form an image on the substrate layer. The second composition includes a colorant and at least one of a photo-curable monomer and a photo-curable oligomer. The first composition and the second composition are photo-cured on the substrate, whereby the first composition defines an exposed adhesive surface which has a second viscosity higher than the first viscosity.

In accordance with another aspect of the exemplary embodiment, an inkjet printing apparatus includes a transport system which transports a substrate material along a paper path from a media feeder to a curing station. A first inkjet printhead, intermediate the media feeder and the curing station, deposits an adhesive-forming composition onto the substrate material. A second inkjet printhead, intermediate the media feeder and the curing station, which deposits at least one ink composition onto the substrate material. The curing station cures the adhesive-forming composition to form an adhesive layer on the substrate material with an adhesive exposed surface region and cures the at least one ink composition to form an ink layer on the substrate material, which defines an image. The apparatus optionally includes at least one of a slitter, downstream of the curing station, which cuts the cured substrate material to form substrate sheets of a selected size, each sheet having an adhesive layer and an ink layer thereon, and a stacker, downstream of the curing station, which stacks the cured and optionally cut substrate material with the adhesive layer and the ink layer thereon to form a stack.

In accordance with another aspect of the exemplary embodiment, an adhesive sign includes a transparent substrate having a first surface and a second surface, the first and second surfaces being spaced by a thickness of up to 0.5 mm. A photo-cured adhesive layer is disposed on the second surface, the adhesive layer defining an exposed region for attachment to an associated structure. The substrate and adhesive layer, in combination, define a transparent window through the adhesive sign. A photo-cured ink layer is disposed on the second surface, the ink layer including an image.

DETAILED DESCRIPTION

Aspects of the exemplary embodiment relate to adhesive printed signs and their use in retail environments.

Figure 1:
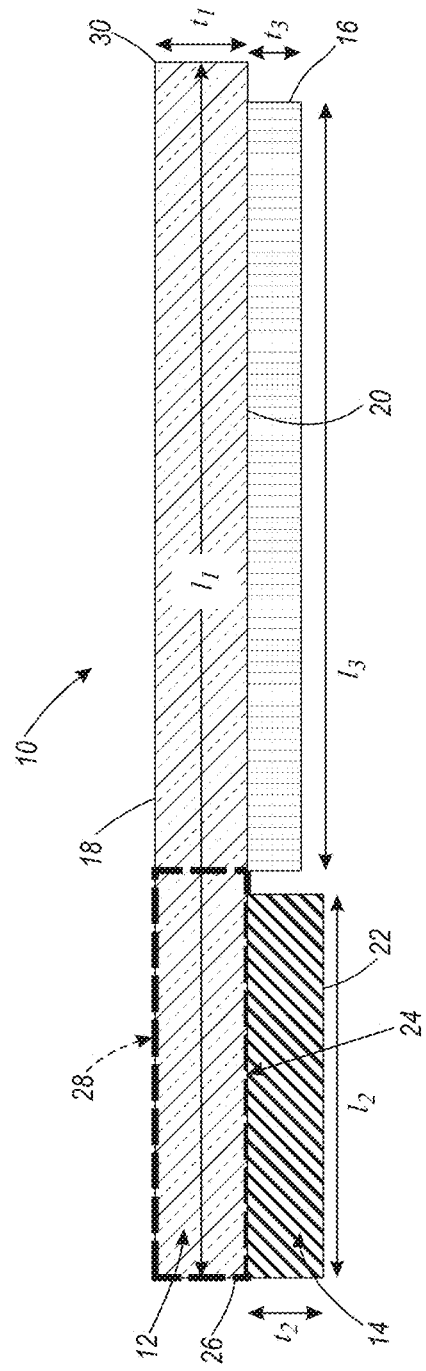
FIG. 1 is a cross-sectional view (not to scale) of one embodiment of an adhesive printed sign.

With reference to FIG. 1, one embodiment of an adhesive printed sign (or label) 10 is shown. The illustrated sign consists of a substrate layer 12, an adhesive layer 14 and a printed layer or coating 16, although additional layers may be included in some embodiments.

The substrate layer 12 may be formed from a flexible transparent printable medium, such as plastic, which defines opposed first and second substantially planar surfaces 18, 20, each having a length $l_1$. The surfaces 18, 20 are spaced by a thickness $t_1$, which is the smallest dimension of the substrate layer. The thickness $t_1$ may be, for example, from 0.1 mm to 0.5 mm, such as up to 0.3 mm. The length $l_1$ may be any suitable length for a sign, such as from 2-50 cm.

The adhesive layer 14 may be formed from a photo-curable adhesive, such as a UV-curable primer, of the type conventionally used for adhering UV-curable inks to a substrate. However, in the exemplary embodiment, the adhesive layer 14 does not primarily serve that function. The adhesive layer 14 is disposed on the second surface 20 of the substrate layer 12 and defines an exposed region on its outer surface 22, which is adhesive. Being exposed allows the adhesive printed sign 10 to be adhered to a surface of a structure, such as a display unit, by the adhesive layer 14. An inner surface 24 of the adhesive layer may be adhered directly to the substrate layer 12. The adhesive layer 14, or at least the outer surface 22 thereof, has a length $l_2$ which is no greater than $l_1$, e.g., less than $l_1$, such that the adhesive layer covers only a portion of the substrate layer, e.g., as a strip. In other embodiments, the adhesive layer may be partially, but not wholly, covered by the printed layer 16. In all embodiments, at least a portion of the adhesive layer remains exposed after forming the printed layer. The length $l_2$ of the exposed portion of the adhesive layer may be, for example, from 0.5-5 cm. While the illustrated adhesive layer 14 is shown as extending from a first end 26 of the substrate layer, in other embodiments, the adhesive layer 14 may be offset from the first end. The adhesive layer has a thickness $t_2$ which may be, for example, at least 4 microns (μm), such as up to 25 μm, or up to 10 μm. The thickness of the adhesive layer may be adjusted to suit the smoothness of the substrate, with higher thicknesses suited to more uneven substrate surfaces.

The printed layer 16, which may include one or more ink layers, is disposed on the second surface 20 of the substrate layer 12. The printed layer 16 includes one or more photo-cured inks, such as cured UV-curable inks, which, in combination, define an image. The printed layer 16 has a thickness $t_3$ and a length $l_3$ which is less than $l_1$, e.g., no more than $l_1-l_2$, to leave a transparent window 28 which provides visibility through the sign 10. The thickness $t_3$ may be, for example, from 4-25 microns, such as up to 10 microns. The length $l_3$ may be, for example, from 1-49 cm. While the illustrated printed layer 16 is shown as extending from a second end 30 of the substrate layer, in other embodiments, the printed layer 16 may be offset from the second end.

Figure 4:
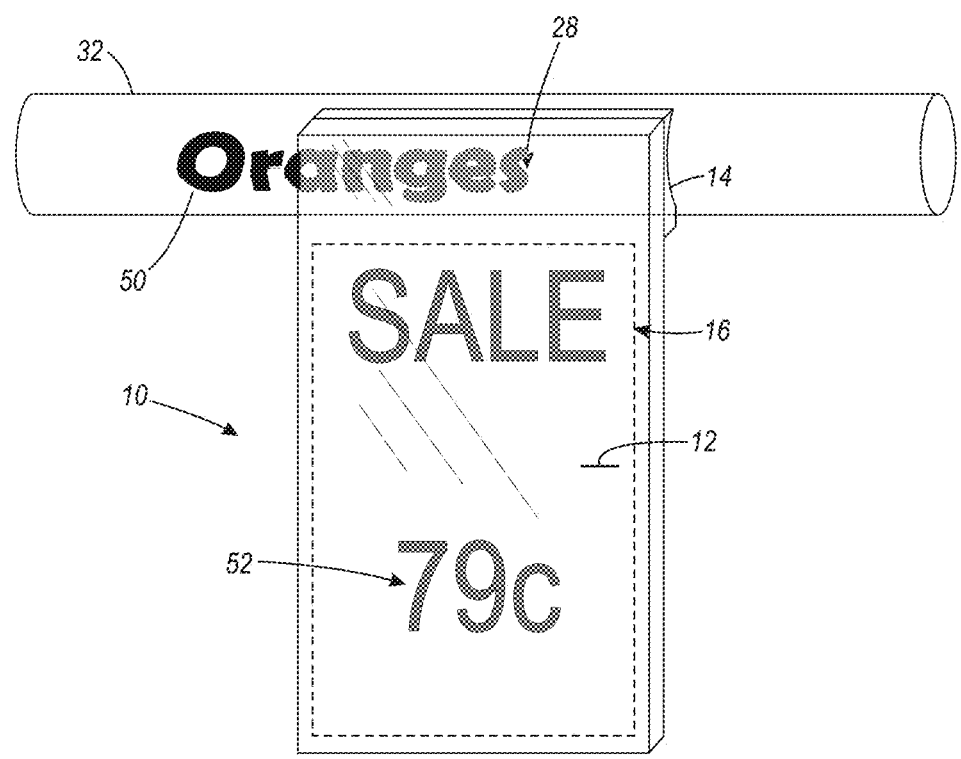
FIG. 4 is a perspective view an adhesive printed sign attached to part of a display unit.

In use, the first surface 18 of the sign 10 is outermost, with the printed layer 16 being visible through the substrate layer 12 and with the adhesive layer 14 attaching the sign to a display structure 32, such as a store shelf or display bar, as illustrated in FIG. 4.

Figure 2:
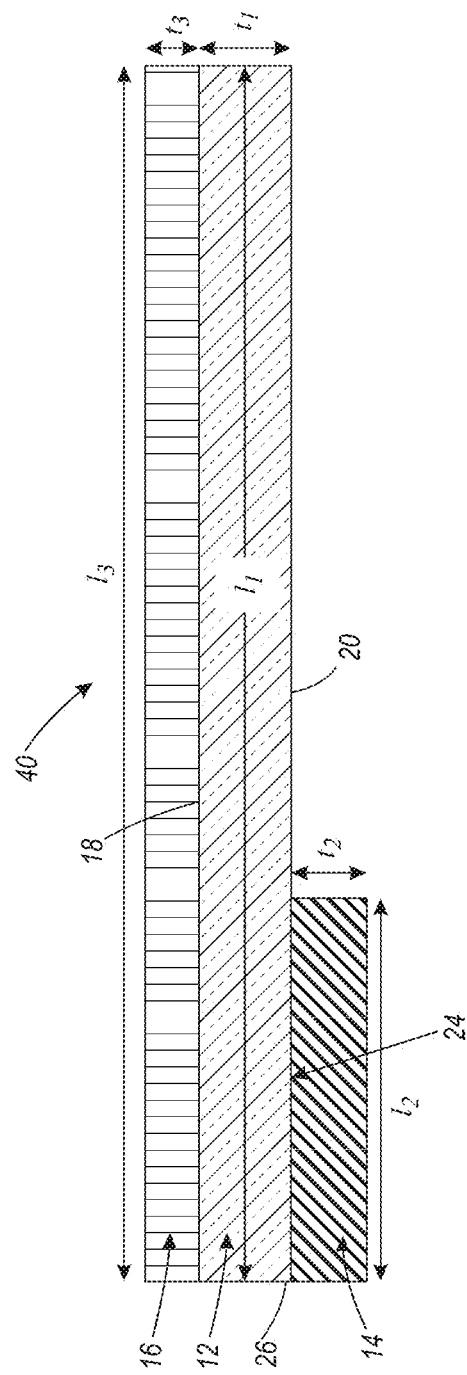
FIG. 2 is a cross-sectional view (not to scale) of another embodiment of an adhesive printed sign.

With reference to FIG. 2, another embodiment of an adhesive printed sign 40 is shown. The sign can be similarly configured to that of FIG. 1, except as noted. Similar elements are accorded the same numerals. In this embodiment, the substrate layer 12 may be formed from a flexible, transparent or opaque printable medium, such as plastic, paper, or card. The adhesive layer 14 is disposed on the second surface 20 of the substrate layer 12, as in the embodiment of FIG. 1, while the printed layer 16 is disposed on the opposed first surface 18 and extends partially or fully between the ends 26, 28 of the substrate 12, i.e., $l_3 \leq l_1$.

Figure 3:
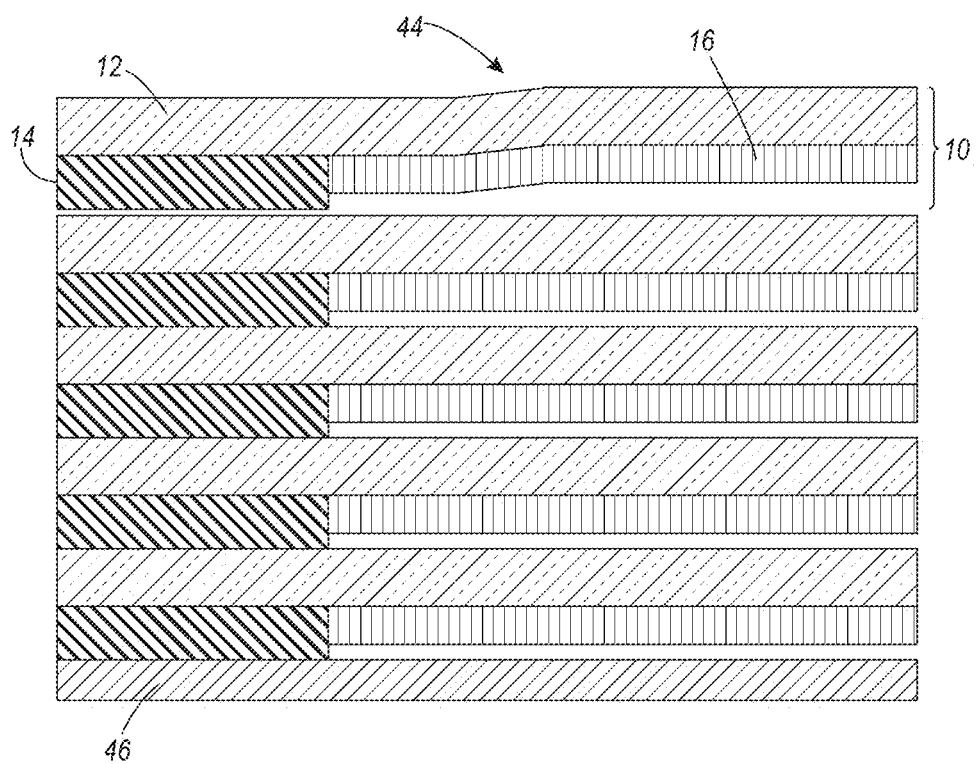
FIG. 3 is a cross-sectional view (not to scale) of one embodiment of a stack of adhesive printed signs.

With reference to FIG. 3, a stack 44 is assembled from multiple adhesive printed signs 10 (or 40). In the stack, the adhesive layer 14 of each sign is removably and adhesively attached to the sign below it, e.g., directly to the substrate layer 12, except for the bottom sign, which may be supported on a release liner 46. The signs can be peeled, in turn, from the stack 44, and attached to a display structure 32, as illustrated in FIG. 4. In the illustrated embodiment, a text image or other image 50 on the display structure 32 is visible through the adhesive layer 14 and transparent substrate 12, via the window 28. The printed layer 16, which includes a printed image 52 (such as text, a photographic image, and/or graphics) is visible through the transparent substrate 12.

The material of the substrate layer 12 can be paper, card, or a synthetic polymer, which may be transparent. Example polymers include $C_2$-$C_6$ polyalkylene polymers, such as polyethylene and polypropylene, polyethylene terephthalate, polycarbonate, polyacrylates and methacrylates, such as polymethylmethacrylate, polyvinylchloride, mixtures thereof, and copolymers thereof. The substrate may alternatively be formed from glass or metal.

The adhesive layer 14 is formed from a photo-curable (e.g., UV-curable) adhesive-forming composition which includes one or more photo-curable monomers and/or oligomers (which are defined as containing up to 8 monomer units) and generally a photoinitiator, which is capable of initiating free-radical polymerization of the monomers/oligomers. The adhesive-forming composition has a viscosity and a surface tension which allow the composition to be dispensed in droplet form from a printhead of an inkjet printer. The adhesive-forming composition is photo-curable by exposure to a radiation source, such as a UV-emitting light emitting diode (UV-LED). When fully photo-cured (i.e., no further polymerization occurs with further exposure to the curing radiation), the resulting adhesive layer has a higher viscosity than the adhesive-forming composition but remains viscous rather than solid and is tacky. It is therefore able to wet a surface, such as the display structure 32 (unlike the cured printed layer 16, which cannot wet another surface). For example, the fully photo-cured adhesive composition may have a viscosity of at least 5000 cP (mPa·s), or at least 10,000 mPa·s, or up to 10,000,000 mPa·s, or up to 100,000 mPa·s, at 25° C., as determined with a Brookfield Dial Reading Viscometer (serial no 200500) with an RV/HB-6 spindle setting, available from AMETEK Brookfield, Middleboro, Mass. 02346 USA. See www.brookfield-engineering.com/products/viscometers/laboratory-viscometers/dial-reading-viscometer.

The viscosity of the uncured adhesive composition may be from 2 to 3000 mPa·s, such as up to 2000 mPa·s, or at least 5 mPa·s, or at least 100 mPa·s, such as about 1000 mPa·s, at 25° C., as determined with the Brookfield Dial Reading Viscometer with an RV/HA-3 spindle setting.

Example monomers for use in the adhesive-forming composition include mono-, di-, and poly-functional acrylates, methacrylates, alkoxylated acrylates, and oligomers thereof. Examples include 1,6-hexanediol diacrylate, tripropylene glycol diacrylate, propoxylated-2-neopentyl glycol diacrylate, alkoxylated hexanediol diacrylate, trimethylol propane triacrylate, ethoxylated trimethylolpropane triacrylate, pentaerythritol tetraacrylate, polyfunctional oligomers such as epoxy acrylates, urethane acrylates and polyester acrylates.

UV primers are used currently to provide a tacky surface to allow UV inks to adhere to solid products such as water bottles or other objects being printed in systems such as the Contoura™ printer by Xerox Corporation. One example UV primer composition suitable for forming the adhesive layer is available from Molecule, 5110-A Port Chicago Hwy, Concord, Calif. 94520 (https://www.molecule.ink/) under the tradename MO178 UV Primer, which remains adhesive when 100% cured, and has been formulated for use in drop-on-demand printers suited to printing on contoured surfaces. Other UV-curable inks with adhesive properties which may be used are described, for example, in above-mentioned U.S. Pub. Nos. 20080316244, 20070093571, 20080063799, 20150353739, and 20140227494.

In one embodiment, the adhesive-forming composition is free or substantially free of silicon-containing compounds, including monomers, oligomers, and polymers, such as silicones. By substantially free, it is meant that the adhesive-forming composition contains less than 2 wt %, or less than 1 wt %, or less than 0.5 wt %, or less than 0.1 wt % of silicon-containing compounds.

The printed layer 16 is formed from one or more photo-curable (e.g., UV-curable) ink compositions. Each ink composition includes a colorant, such as a pigment or dye, one or more photo-curable monomers and/or oligomers, generally a photoinitiator capable of initiating free-radical polymerization of the monomers/oligomers, and optionally one or more auxiliary additives. The UV-curable ink composition is of a type that undergoes a polymerization reaction and curing upon exposure to a radiation source, such as a UV-emitting light emitting diode (UV-LED). In contrast to the adhesive composition, however, the ink compositions harden when fully cured and are no longer viscous. For example, the photo-cured inks may have a hardness of at least 2 or at least 3 on the Mohs' hardness scale and/or a hardness, as measured by indentation, of at least 50 MPa, as determined by the Knoop hardness test. The viscosity of the uncured ink composition may be from 2 to 50 mPa·s, such as up to 30 mPa·s or at least 5 mPa·s, at 25° C., as determined with the Brookfield Dial Reading Viscometer with an RV/HA-3 spindle setting.

Example monomers and oligomers for use in the ink composition include unsaturated monomers, such as mono-functional, di-functional, and polyfunctional acrylates, methacrylates, N-vinylamides, acrylamides, and combinations thereof. Example acrylates include isoamyl acrylate, stearyl acrylate, lauryl acrylate, octyl acrylate, decyl acrylate, isoamylstyl acrylate, isostearyl acrylate, 2-ethylhexyldiglycol acrylate, 2-hydroxybutyl acrylate, 2-acryloyloxy-ethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, vinyl ether ethoxy(meth)acrylate, 2-acryloyloxyethyl succinic acid, 2-acryloyloxyethyl phthalic acid, 2-acryloyloxyethyl-2-hydroxyethyl phthalic acid, lactone modified flexible acrylate, and t-butylcyclo-hexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, ethoxylated trimethylolpropane triacrylate, tri(propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glyceryl propoxy triacrylate, caprolactam modified dipentaerythritol hexaacrylate, caprolactone acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate, alkoxylated cyclohexanone dimethanol acrylate, alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate neopentyl glycol diacrylate, propoxylated glycerine triacrylate, propoxylated trimethylolpropane triacrylate, di-trimethylolpropane tetraacrylate, dipentaerythritol pentaacrylate, ethoxylated pentaerythritol tetraacrylate, methoxylated glycol acrylates and acrylate esters.

Example methacrylates may be used that correspond to the above-mentioned acrylates. Examples of such methacrylates include methoxypolyethylene glycol methacrylate, methoxytriethylene glycol methacrylate, hydroxyethyl methacrylate, phenoxyethyl methacrylate, cyclohexyl methacrylate, tetraethylene glycol dimethacrylate, and polyethylene glycol dimethacrylate.

Example N-vinylamides include N-vinylcaprolactam and N-vinylformamide. Example acrylamides include acryloylmorpholine.

The monomers and oligomers may together be at least 5 wt %, or at least 10 wt %, or at least 20 wt %, or at least 50 wt %, or up to 99 wt % of the ink composition.

Example photo-initiators for use in the ink composition(s) and/or adhesive-forming composition include benzophenone, benzoin, acetophenone, thioxanthone, and acylphosphine oxide. The photo-initiator maybe at least 0.1 wt %, or at least 0.2 wt % of the respective composition, such as up to 8 wt %, or up to 4 wt Vo, or up to 2 wt Vo, or up to 1 wt %.

Example colorants include organic dyes and pigments. Example pigments include milled pigments, including inorganic pigments, such as carbon black, titanium dioxide, cobalt blue, chrome yellow, and iron oxide, and organic pigments.

Example auxiliary additives include defoaming agents, dispersants, wetting agents, surfactants, leveling agents, and the like.

The ink composition may include a liquid medium such as water or an organic solvent, such as an alkane, alcohol, ether, combination thereof, or the like.

Suitable release liners 46 include silicone- or polyalkylene-coated release substrates, such as those formed of paper, polyester, polyethylene or a thermoplastic material. Such substrates are often coated with a thermally-cured silicone release coating, such as a cross-linked, vinyl functionalized polydimethylsiloxane, UV curable silicone, or electron-beam curable silicone.

Figure 5:
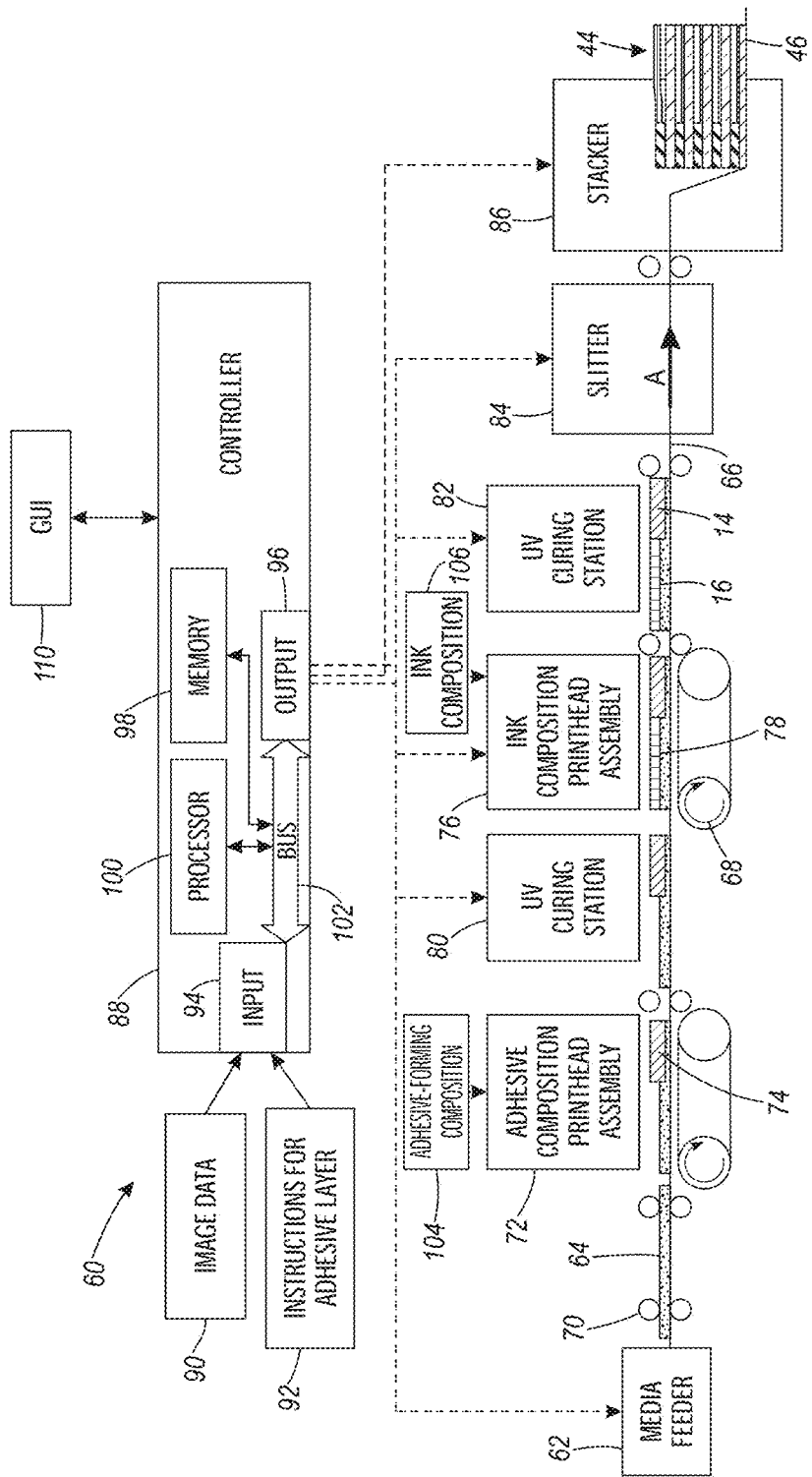
FIG. 5 illustrates a printing device suitable for forming the adhesive printed signs of FIG. 1 in accordance with another embodiment.

With reference now to FIG. 5, an inkjet printing apparatus 60 suited to forming the sign (or label) 10 in simplex mode is shown. A media feeder 62 feeds substrate material 64, in roll or sheet form, in a downstream direction A along a paper path 66. The substrate material 64 is transported along the path 66 by a transport mechanism composed of driven rollers 68, idler rollers 70, belts, and/or other transport members. Optionally, a pretreatment is applied to the substrate material 64 at a pretreatment station (not shown), such as a flame, plasma discharge, or corona discharge. A first printhead assembly 72 deposits an adhesive-forming composition 74 onto the substrate material 64. A second printhead assembly 76, downstream of the first printhead assembly 72, deposits one or more ink compositions 78 onto the adhesive-coated substrate material 64. Optionally, a first UV curing station 80, intermediate the printhead assemblies 72, 76, at least partially cures the adhesive-forming composition prior to application of the adjacent ink composition 78. A second (or only) UV curing station 82, downstream of second printhead assembly 76, cures the ink composition 78 and may cure or partially cure the adhesive-forming composition 74. A slitter 84, downstream of the UV curing station 82, receives the UV-cured substrate 64 with the adhesive layer 14 and printed layer 16. The slitter 84 cuts the substrate into sign-sized pieces. A stacker 86 collates and stacks the cut pieces into a stack 44, which is output from the printer device. As will be appreciated, the substrate, in sheet form, may be assembled into a stack before final cutting to the desired shape. A release liner 46 may be applied to the bottom layer of the stack before or after assembly.

The operating components of the printing apparatus 60, such as media (sheet) feeder 62, print head assemblies 72, 76, curing stations 80, 82, slitter 84, stacker 86, and media transport system 68, 70, may be under the control of a controller 88. The controller receives image data 90 for forming one or more images 52 on the sheet media 64 and may also receive instructions 92 regarding a selected size and position of the adhesive layer 14. Since a single sheet of media may be cut to form smaller-sized signs, several images and adhesive layers may be printed on a single sheet 64 or continuous roll. The controller may include an input device 94, which receives the image data 90 and instructions 92, an input/output device 96, which outputs control instructions to the operational components of the printing device, and which also may receive feedback therefrom, memory 98 which stores instructions for operating the printing apparatus, or various operational components thereof, and a processor device 100, in communication with the memory, for executing the instructions. The hardware components 94, 96, 98, 100 of the controller 88 may be communicatively connected by a data/control bus 102.

The printhead assemblies 72, 76 include printheads which eject the adhesive-forming composition and ink composition(s), respectively, onto the media sheets 64. In particular, the assembly 72 includes a supply 104 of adhesive-forming composition 74, in liquid form. The controller 88 modulates the volume of the adhesive drops ejected by the printheads of the assembly 72 to form the adhesive layer. The controller 88 also modulates the volume of the ink drops ejected by the printheads of the assembly 76 to form the selected image 52. In particular, the controller 88 is configured to receive image data from an image data source (not shown) and optionally instructions for the adhesive layer, and generate firing signals for the operation of the printheads in the printhead assemblies 72, 76 for the formation of the adhesive layer and ink images on media sheets as the sheets pass by the printheads. The controller may operate the media feeder 62 to retrieve media sheets from a storage receptacle for the sheets and feed the sheets onto the paper path and the transport system components 68.

The image data 90 generally include information in electronic form that the controller renders and uses to operate the inkjet ejectors in printheads in the printer to compensate for moisture in ink and to form an ink image on media sheets. These data can include text, graphics, pictures, and the like. The operation of producing images with colorants on print media, for example, graphics, text, photographs, and the like, is generally referred to herein as printing or marking. The inkjet printing apparatus 60 may be a drop-on-demand inkjet printer.

The printheads of assemblies 72, 76 are configured with inkjet ejectors to eject drops of the adhesive-forming composition 74 or ink composition 78 from a supply 106, respectively, onto a receiving surface 20 of the substrate 64. A typical printhead suited to use in the assembly 76 includes a plurality of inkjet ejectors that eject ink drops of one or more ink colors onto the image receiving surface in response to firing signals that operate actuators in the inkjet ejectors. The inkjets are arranged in an array of one or more rows and columns in the process and cross-process directions. In some embodiments, the inkjets are arranged in staggered diagonal rows across a face of the printhead. Various printer embodiments include one or more printheads that form ink images on an image receiving surface. Some printer embodiments include a plurality of printheads arranged in a print zone. As an example, print head ejectors may be designated for cyan, magenta, yellow, and black (C, M, Y, K) and optionally white inks, respectively. The printhead employed in the assembly 72 may be similarly configured, since the adhesive-forming composition are of low enough viscosity to be dispensed as droplets in the same manner.

In the embodiment of FIG. 5, the adhesive composition and ink composition(s) are applied to the same side of the substrate, so there is no need to position an inverter between the assemblies 72, 76. To form the signs of FIG. 2, the printing apparatus may be similarly configured to that of FIG. 5, except that an inverter is positioned between the assemblies 72, 76, e.g., downstream of the first UV curing station 80 and upstream of the assembly 76. The inverter, where used, turns the sheet media over, so that the adhesive layer and printed layer are formed on opposed sides of the substrate.

In some embodiments, the positions of the assemblies 72, 76 may be reversed, such that the image 52 is formed on the substrate prior to forming the adhesive layer. In some embodiments, the assemblies 72, 76 may be combined into a single assembly (and the intermediate UV curing station omitted).

As used herein, the term "downstream direction" or "process direction" refers to movement along the path towards the stacker and "cross-process direction" refers to a direction orthogonal to the process direction axis in the plane of the paper path 66.

The UV curing stations 80, 82 (or more generally radiation-curing stations) include one or more sources of radiation, such as UV radiation. As an example, each may include a UV-emitting LED or an array of such UVLEDs. The UVLEDs are controlled to apply sufficient radiation to cure the image 52 and the adhesive layer 14.

The apparatus 60 may include a graphical user interface (GUI) 110, which allows a user to input commands to the processor, such as one or more of the size of the signs, the number of signs to be assembled into a stack, amount of adhesive-forming composition to be used, and the like, or information from which these parameters can be determined. The apparatus 60 may include an optical scanner (not shown) as the source of the image data 90.

Figure 6:
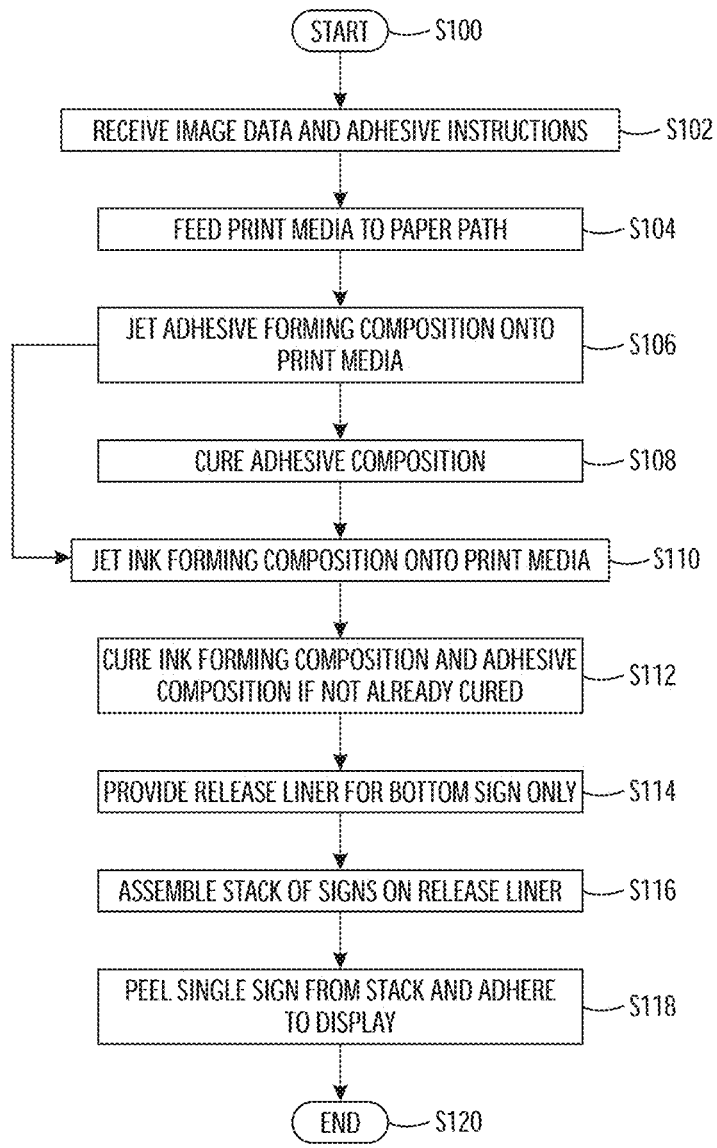
FIG. 6 illustrates a method of forming a stack of adhesive printed signs in accordance with another embodiment.

With reference to FIG. 6, a method for forming a stack of printed adhesive signs which can be performed with the printing apparatus of FIG. 5 is shown. The method begins at S100.

At S102, image data 90, and optionally adhesive layer instructions 92 are received by the controller 88.

At S104, print media 64, such as single layer clear stock, is fed by the media feeder 62 to a paper path 66 of the printing apparatus 60. In some embodiments, the surface 20 of the print media may be pretreated, e.g., by flame, corona, or plasma treatment, to improve wettability with the adhesive layer.

At S106, an adhesive-forming composition 74 is ink-jetted onto the substrate 64. In one embodiment, the controller 88 controls the assembly 72 to eject droplets of the adhesive-forming composition.

At S108, the substrate, with the adhesive-forming composition thereon, may be partially or completely cured, e.g., by the curing station 80.

At S110, an ink forming composition 78 is ink-jetted onto the substrate 64 to form an image 52 that corresponds to the received image data 90, leaving at least a portion 22 of the adhesive-forming composition/cured adhesive layer exposed to the atmosphere. In one embodiment, the controller 88 controls the assembly 76 to eject droplets of the ink composition(s) in accordance with the image data 90. For example, the UV inks can be used to print text and images on the substrate and then print a layer of white ink to form a white background. The top portion 28 of the sign (left side in FIGS. 1 and 2) can be left transparent for unit pricing visibility.

As will be appreciated, for the sign 40 of FIG. 2, the substrate 64 may be inverted prior to this step.

At S112, the substrate is cured to cure the ink composition 78 jetted onto the substrate and to cure or complete the cure of the adhesive-forming composition 104. In particular, the controller controls the UV curing station 82 to effect the curing.

At S114, a release liner 46 may be applied to some of the cured sheets which are to form a bottom layer in the stack 44.

At S116, the UV-cured, printed and adhesive coated substrate sheets are assembled into a stack and cut to the desired size to form a stack 44 of signs 10. The resulting stack 44 includes a plurality of signs but has only one release liner 46.

At S118, a sign 10 can be peeled from the stack 44 and the variably printed top-portion of the sign, which includes an adhesive layer 14, is used to adhere the sign to a shelf edge or end caps of a product display unit. The sign remains adhesive for an extended period of weeks or months and thus can be peeled from the display structure when it is no longer needed.

The method ends at S120.

As will be appreciated, fewer, more or different steps may be performed in the method, and all steps need not be performed in the same order as shown in FIG. 6.

The exemplary signs find application in retail displays, although other applications where adhesive signs are used are also contemplated, such as directly on products.

The apparatus and method allow using UV inks and a UV print system to not only print the retail signage but use the unique properties of the UV inks and UV primers to create the signage on one media layer while printing both the sign information and the adhesive in one process.

An additional benefit is the ability of stacking these signs post processing to create a Post-It™ type stack where no release liner is needed and aisle sorted stacks can be delivered to each store for application based on sales data.

The method provides for a low cost solution that reduces media substrate complexity, creates less waste due to the reduction in media layers while still being able to provide for a transparent window. The sign cards can be fully cured while still allowing for adhesive properties to adhere signs to the shelving and creating a card that allows for self-adhesive properties to create a variable printed pad of store signage.

Specific advantages reside in: using a cured UV primer to create a variably printed adhesive strip to hold up store signage; using a combination of UV primer and UV ink to create a single media layer sign that uses UV ink and UV primer to combine the functions of adhesion of the sign to the shelves and the marketing printed data without the need for additional media layers; printing UV primer that becomes an adhesive in the print module rather than adding an additional adhesive either post process or pre-process at the converter that needs a release liner; ability to not need a release liner, reducing time in hanging the signs and lowering the amount of scrap generated; avoiding additional adhesive layers; stacking signs one on top of another to create a variable printed store sign stack that can be used to mark each aisle; ability to provide adhesive properties only where needed, and limiting glue buildup issues in the post process cutting systems.

A prototype variable data retail signage with adhesive backing using Ultra Violet inks and a print system was implemented on the laboratory scale.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of forming a stack of adhesive signs comprising:

providing a transparent substrate layer having opposed first and second surfaces;

inkjet printing a first composition on the second surface of the substrate layer, the first composition comprising at least one of a photo-curable monomer and a photo-curable oligomer, the first composition having a first viscosity;

after inkjet printing the first composition, inkjet printing a second composition to form an image layer on the second surface of the substrate layer, leaving at least a portion of the first composition, or an adhesive layer formed therefrom, exposed to the atmosphere, the second composition comprising a colorant and at least one of a photo-curable monomer and a photo-curable oligomer;

photo-curing the first composition and the second composition on the substrate layer, whereby the photo-cured first composition defines the adhesive layer, the adhesive layer having an exposed adhesive surface and having a second viscosity higher than the first viscosity;

each adhesive sign comprising the substrate layer with the photo-cured first and second compositions or comprising a sheet formed by cutting the substrate with the photo-cured first and second compositions into sheets, each sheet having an adhesive layer and an image layer thereon; and forming a stack comprising a plurality of the adhesive signs, whereby the adhesive layer of a first of the adhesive signs is in adhesive contact with the substrate of a second of the adhesive signs.

2. The method of claim 1, further comprising stacking the plurality of adhesive signs on a release liner.

3. A stack of adhesive signs formed by the method of claim 1.

* * * * *